(12) United States Patent
Lee et al.

(10) Patent No.: US 8,886,360 B2
(45) Date of Patent: Nov. 11, 2014

(54) MOTOR VELOCITY CONTROL APPARATUS AND METHOD

(75) Inventors: Ki Moon Lee, Yongin-si (KR); Chi Gun An, Osan-si (KR); Duke Kimm, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 581 days.

(21) Appl. No.: 13/200,712

(22) Filed: Sep. 29, 2011

(65) Prior Publication Data

US 2012/0109374 A1     May 3, 2012

(30) Foreign Application Priority Data

Oct. 27, 2010 (KR) .................. 10-2010-0105341

(51) Int. Cl.
    *G06F 19/00*     (2011.01)
    *G05B 19/416*     (2006.01)

(52) U.S. Cl.
    CPC .... *G05B 19/416* (2013.01); *G05B 2219/43018* (2013.01); *Y10S 901/02* (2013.01); *Y10S 901/20* (2013.01)
    USPC ............... 700/261; 700/256; 901/2; 901/20; 318/568.18; 318/568.22

(58) Field of Classification Search
    CPC ........ G05B 19/19; G05B 19/25; G05B 19/37; G05B 19/416; B25J 9/1656; B25J 9/1664; B25J 9/1671
    USPC .............. 700/245, 256, 261; 901/2, 20; 318/568.18, 568.22
    See application file for complete search history.

(56) References Cited

U.S. PATENT DOCUMENTS

| | | | | |
|---|---|---|---|---|
| 4,705,999 A * | 11/1987 | Soji et al. | ................. | 318/568.18 |
| 4,972,131 A * | 11/1990 | Kojyo et al. | ............... | 318/568.1 |
| 4,988,934 A * | 1/1991 | Toyoda et al. | ........... | 318/568.15 |
| 5,434,489 A * | 7/1995 | Cheng et al. | ............ | 318/568.15 |
| 5,627,440 A * | 5/1997 | Yamamoto et al. | ...... | 318/568.21 |
| 5,655,060 A * | 8/1997 | Lucas | ........................... | 700/250 |
| 5,910,893 A * | 6/1999 | Itoh | ................................ | 700/56 |
| 6,002,971 A * | 12/1999 | Lucas | ........................... | 700/250 |
| 6,092,004 A * | 7/2000 | Harima | ......................... | 700/252 |
| 6,127,792 A * | 10/2000 | Kamiya et al. | ................ | 318/432 |
| 6,507,165 B2 * | 1/2003 | Kato et al. | .................... | 318/611 |
| 6,643,563 B2 * | 11/2003 | Hosek et al. | ................... | 700/245 |
| 6,988,020 B2 * | 1/2006 | Inch et al. | ..................... | 700/213 |
| 7,068,002 B2 * | 6/2006 | Tsutsui | ........................ | 318/560 |
| 7,076,322 B2 * | 7/2006 | Chandhoke | ................... | 700/181 |
| 7,627,387 B2 * | 12/2009 | Ueda et al. | ..................... | 700/63 |
| 7,800,329 B2 * | 9/2010 | Umeda et al. | ................. | 318/434 |

* cited by examiner

*Primary Examiner* — Thomas G Black
*Assistant Examiner* — Peter D Nolan
(74) *Attorney, Agent, or Firm* — Staas & Halsey LLP (57) ABSTRACT

A motor velocity control apparatus and method in which the velocity of a motor to drive a joint of a robot is controlled. The method includes generating a velocity profile of the motor based on velocity profile generation data received from a user; judging whether one velocity section selected from velocity sections divided from the generated velocity profile corresponds to a high velocity region, where the high velocity region corresponds to an acceleration compensation section in which an acceleration section transitions to a constant velocity section; estimating an acceleration corresponding to the current velocity of the motor, upon judging that the velocity section corresponds to the high velocity region, the acceleration corresponding to the current velocity is estimated using an acceleration-velocity graph in the acceleration compensation section or a deceleration compensation section; compensating for the velocity profile using the estimated acceleration; and driving the motor using the compensated velocity profile.

7 Claims, 7 Drawing Sheets

FIG. 6

MOTOR VELOCITY CONTROL APPARATUS AND METHOD

CROSS-REFERENCE TO RELATED APPLICATIONS

This application claims the benefit of Korean Patent Application No. 2010-0105341, filed on Oct. 27, 2010 in the Korean Intellectual Property Office, the disclosure of which is incorporated herein by reference.

BACKGROUND

1. Field

Embodiments of the present disclosure relate to a motor velocity control apparatus and method in which the velocity of a motor to drive a joint of a robot is controlled.

2. Description of the Related Art

In general, machineries which perform motions similar to those of humans using electrical or magnetic action are referred to as robots. Recently, robots have been used in various fields due to development of control techniques thereof. For example, there are home service robots at home, service robots in public places, transfer robots in industrial lines, and worker assistance robots. These robots perform operation using manipulators designed so as to perform a motion similar to that of human arms or hands through an electromechanical mechanism.

Most manipulators which are used now include a plurality of interconnected links. Interconnection portions between the links are referred to as joints, and a motor to drive the corresponding joint is installed at each joint.

The motor installed at each joint is driven according to a velocity profile. The velocity profile represents a movement amount of the motor required per control cycle so as to drive the motor. The motor is driven by a command representing a movement position thereof, obtained through the integration of such a value, per control cycle.

The velocity profile used to drive the motor is generated using jerks influencing driving of the motor, acceleration/deceleration, velocity, and position. Since an allowable torque generated by the motor tends to be decreased while approaching a high velocity region in the same manner as a velocity-torque curve (hereinafter, referred to as an NT-curve), in order to stably use the motor in all velocity regions, load of the motor needs to be adjusted such that the motor moves within the rated velocity or generates only a small torque if the motor is driven at a high velocity.

For this purpose, a method, in which the highest RPM of the motor is set to the rated RPM of the motor and the velocity profile is generated based on the rated RPM and regions in which RPM exceeds the rated RPM are excluded, is the most general. If the motor is used under the above conditions, the motor is driven at maximum torque in all velocity regions, and thus this method is advantageous in that the motor is easily designed and conveniently controlled. However, since the regions in which RPM exceeds the rated RPM are not used, this method is disadvantageous in that efficiency of the motor velocity is considerably low.

In order to solve above the above disadvantage, a velocity profile compensation algorithm in which torques applied to respective joints of a robot are calculated in real time using dynamics so as to drive the motor up to the maximum velocity has been proposed. However, in case of the compensation algorithm using dynamics, a complicated dynamic equation needs to be solved per control cycle, and a difference between actually required torque and torque calculated using dynamics occurs due to friction generated by a decelerator and the motor may be driven at a torque exceeding or below the allowable torque of the motor.

SUMMARY

Therefore, it is an aspect of the present disclosure to provide a motor velocity control apparatus and method in which a velocity profile to drive a motor is calculated in real time using acceleration to control the motor such that the velocity of the motor is raised to the maximum velocity.

Additional aspects of the disclosure will be set forth in part in the description which follows and, in part, will be apparent from the description, or may be learned by practice of the disclosure.

In accordance with one aspect of the present disclosure, a method of controlling a velocity of a motor to drive a joint of a robot includes generating a velocity profile of the motor based on velocity profile generation data received from a user, judging whether or not one velocity section selected from velocity sections divided from the generated velocity profile corresponds to a high velocity region, estimating an acceleration corresponding to the current velocity of the motor, upon judging that the velocity section corresponds to the high velocity region, compensating for the velocity profile using the estimated acceleration, and driving the motor using the compensated velocity profile.

The velocity sections divided from the generated velocity profile may include an acceleration section, an acceleration compensation section, a constant velocity section, a deceleration compensation section, and a deceleration section.

The high velocity region may correspond to the acceleration compensation section in which the acceleration section transitions to the constant velocity section.

The high velocity region may correspond to the deceleration compensation section in which the constant velocity section transitions to the deceleration section.

In the estimation of the acceleration corresponding to the current velocity, the acceleration corresponding to the current velocity may be estimated using an acceleration-velocity graph in the acceleration compensation section or the deceleration compensation section.

The acceleration-velocity graph may be a pattern table in which the acceleration corresponding to the current velocity is stored in advance using the fact that the acceleration is directly proportional to a torque of the motor.

In the compensation of the velocity profile, the velocity of the motor may be calculated using the following equation and the velocity profile may be compensated for using the calculated velocity of the motor, if the high velocity region corresponds to the acceleration compensation section:

$$(a+1)^{n-1}\left(V_r + \frac{b}{a}\right) - \frac{b}{a}$$

where, Vr represents an acceleration compensation start/escape velocity, a represents a first acceleration compensation graph constant, b represents a second acceleration compensation graph constant, and n represents a sampling time.

In the compensation of the velocity profile, the velocity of the motor may be calculated using the following equation and the velocity profile may be compensated for using the calculated velocity of the motor, if the high velocity region corresponds to the deceleration compensation section:

$$(1-a)^n \left(V_g + \frac{b}{a}\right) - \frac{b}{a}$$

where, Vg represents a final velocity, a represents a first acceleration compensation graph constant, b represents a second acceleration compensation graph constant, and n represents a sampling time.

In accordance with another aspect of the present disclosure, a motor velocity control apparatus includes a motor to drive a joint of a robot, a velocity profile generation unit to generate a velocity profile of the motor based on velocity profile generation data received from a user, an acceleration estimation unit to estimate an acceleration in a high velocity region of the generated velocity profile, a velocity profile compensation unit to compensate the velocity profile using the estimated acceleration, a motor drive unit to drive the motor using the compensated velocity profile, and a motor control unit to judge whether or not one velocity section selected from velocity sections divided from the generated velocity profile corresponds to the high velocity region, to estimate the acceleration corresponding to the current velocity of the motor, upon judging that the velocity section corresponds to the high velocity region, to calculate the velocity of the motor using the estimated acceleration, and to compensate for the velocity profile using the calculated velocity of the motor.

The velocity sections divided from the generated velocity profile may include an acceleration section, an acceleration compensation section, a constant velocity section, a deceleration compensation section, and a deceleration section.

The motor control unit may judge the acceleration compensation section in which the acceleration section transitions to the constant velocity section or the deceleration compensation section in which the constant velocity section transitions to the deceleration section to be the high velocity region.

The motor control unit may estimate the acceleration corresponding to the current velocity using an acceleration-velocity graph in the acceleration compensation section or the deceleration compensation section.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
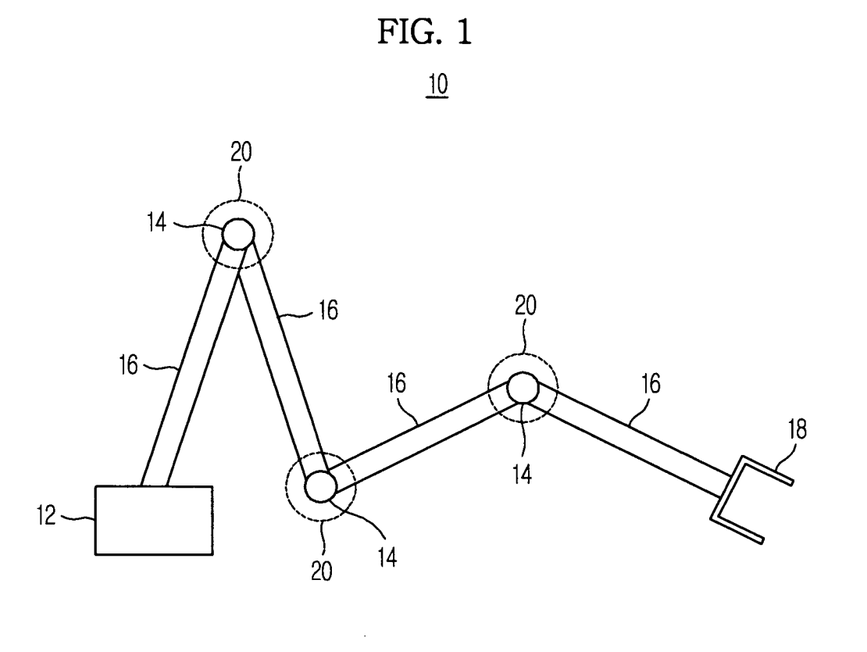
FIG. 1 is a schematic view illustrating a manipulator of a robot in accordance with an embodiment of the present disclosure.

FIG. 1 is a schematic view illustrating a manipulator of a robot in accordance with an embodiment of the present disclosure.

As shown in FIG. 1, the manipulator 10 in accordance with the embodiment of the present disclosure is a machinery unit, which moves a target object in a three-dimensional space or performs a required operation, and includes a base 12 serving to support the manipulator 10, a plurality of links 16 interconnected by joints 14, and motors 20 installed at the respective joints 14 and connected to the joints 14 using decelerators.

A shaft of each of the motors 20 is driven at a proper velocity and acceleration/deceleration according to a velocity profile.

The velocity profile represents a movement amount of the motor 20 required per control cycle to drive the motor 20. A method of generating the velocity profile will be described later with reference to FIG. 2.

An end-effector 18 corresponding to a human hand, such as a gripper to grip a target object, a spray gun used to paint a target object, an electrode contact for spot-welding, a welding torch for welding, a drill, a grinder, or a water jet for cutting, is provided at the front end of the manipulator 10.

Although this embodiment exemplarily illustrates the manipulator 10 of the robot, the embodiment of the present disclosure is not limited thereto and may be applied to all robots having joints 14 and all machineries driven by motors 20.

Figure 2:
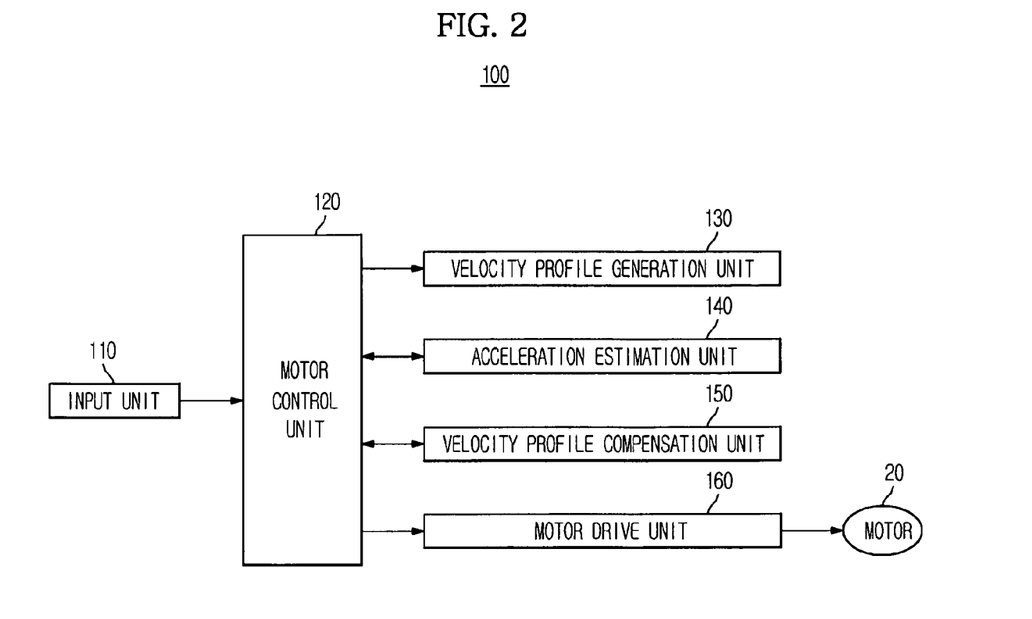
FIG. 2 is a block diagram of a motor velocity control apparatus to generate a velocity profile of a motor in accordance with the embodiment of the present disclosure.

FIG. 2 is a block diagram of a motor velocity control apparatus to generate the velocity profile of the motor in accordance with the embodiment of the present disclosure.

As shown in FIG. 2, the motor velocity control apparatus 100 in accordance with the embodiment of the present disclosure includes an input unit 110, a motor control unit 120, a velocity profile generation unit 130, an acceleration estimation unit 140, a velocity profile compensation unit 150, and a motor drive unit 160.

The input unit 110 is electrically connected to the motor control unit 120, which performs overall control to generate the velocity profile of the motor 20.

The input unit 110 is used to receive velocity profile generation data to generate the velocity profile from a user.

The velocity profile generation data includes a movement amount, a velocity, an acceleration time, and a deceleration time of the motor 20. Further, the velocity profile generation data may include an acceleration and a deceleration of the motor 20 instead of the acceleration time and the deceleration time.

Further, the velocity profile generation unit 130, the velocity estimation unit 140, the velocity profile compensation unit 150, and the motor drive unit 160 are electrically connected to the motor control unit 120.

The velocity profile generation unit 130 generates the velocity profile based on the movement amount, the velocity, the acceleration time, and the deceleration time of the motor 20, received through the input unit 110 according to a control signal of the motor control unit 120.

As described above, the velocity profile represents the movement amount of the motor 20 required per control cycle to drive the motor 20. The motor 20 is driven by a command representing a movement position thereof, obtained through integral of the movement amount, per control cycle.

That is, the velocity profile of the motor 20 represents a series of velocity values of the motor 20 at each time so as to move the joint 14 of the robot from a start position to a target position.

The motor 20 is driven according to the generated velocity profile. In the velocity of the motor 20, an allowable torque generated by the motor 20 tends to be decreased while approaching a high velocity region in the same manner as a velocity-torque curve, generally referred to as an NT-curve.

Conventionally, a torque was calculated based on a current position, a velocity, and an acceleration through the dynamic equation of a robot, and it was judged whether or not the robot moves at the current torque of the robot by comparing the calculated torque with the NT-curve in real time. In a region where the current torque of the robot exceeds the NT-curve, a method in which the torque is restricted so as to satisfy the NT-curve was used.

However, in this case, since the torque is calculated per control cycle by the complicated dynamic equation and the acceleration is calculated according to the calculated torque, there is a possibility of not completing the calculation within the short control cycle.

Therefore, the embodiment of the present disclosure proposes a method in which the acceleration of the motor 20 is estimated based on an acceleration-velocity graph determined experimentally similar to the NT-curve of the motor using the fact that the torque of the motor 20 is directly proportional to the acceleration of the motor 20 with regard to a shaft to which gravity is not applied.

For this purpose, the acceleration estimation unit 140 stores a pattern table including an acceleration made by data measured through experimentation, i.e., a pattern representing acceleration values according to velocities at respective sampling times, and estimates the current acceleration of the motor 20.

The velocity profile compensation unit 140 calculates a velocity from the estimated acceleration, and then compensates for the previously generated velocity profile using the velocity in real time.

Here, the estimated acceleration represents an acceleration of the motor 20 per control cycle, and the velocity represents the maximum velocity of the motor 20.

Further, the compensated velocity profile includes portions corresponding to respective velocity sections of the velocity profile previously generated by the velocity profile generation unit 130. This will be described in detail with reference to FIG. 6.

That is, the velocity profile compensation unit 150 compensates for the previously generated velocity profile so as to have a calculated velocity value (i.e., the value of the maximum velocity of the motor 20) instead of the velocity value in the current control cycle of the previously generated velocity profile. Here, the compensated velocity profile is a velocity profile in which velocity values at respective times are compensated for so as to have the same target position and target velocity as those of the previously generated velocity profile.

The motor drive unit 160 drives the motor 20 using the previously generated velocity profile or the compensated velocity profile according to the control signal from of the motor control unit 120. Thereby, the motor 20 is driven so as to trace the previously generated velocity profile or the compensated velocity profile during one control cycle.

That is, the motor drive unit 160 drives the motor 20 so that the velocity of the motor 20 reaches a velocity value on the previously generated velocity profile or a velocity value on the compensated velocity profile corresponding to the current control cycle.

The motor control unit 120 provides velocity profile generation data received through the input unit 110, such as the movement amount, the velocity, the acceleration time, and the deceleration time, to the velocity profile generation unit 130, and generates a velocity profile through the velocity profile generation unit 130.

Here, the generated velocity profile represents velocity values in respective sections satisfying the target movement amount, the target velocity, the target acceleration time, and the target deceleration time, received through the input unit 110.

Further, the motor control unit 120 estimates the current acceleration of the motor 20 using the experimentally determined acceleration-velocity graph similar to the NT-curve of the motor 20 per control cycle through the acceleration estimation unit 140.

Further, the motor control unit 120 compensates for the previously generated velocity profile in each velocity section using the acceleration estimated by the acceleration estimation unit 140 through the velocity profile compensation unit 150.

Here, the acceleration of the motor 20 is estimated based on the acceleration-velocity graph representing relations between the velocity and acceleration of the motor 20, and indicates an acceleration value corresponding to the current velocity of the motor 20. The acceleration-velocity graph is stored as an acceleration pattern table in advance.

That is, the motor control unit 120 compensates for the velocity profile in each velocity section using the acceleration on the previously generated velocity profile.

Further, the motor control unit 120 controls the motor drive unit 160 so as to drive the motor 20 according to the compensated velocity profile. That is, the motor control unit 120 drives the motor 20 so that the velocity of the motor 20 reaches a velocity value on the compensated velocity profile corresponding to the current control cycle.

Figure 3:
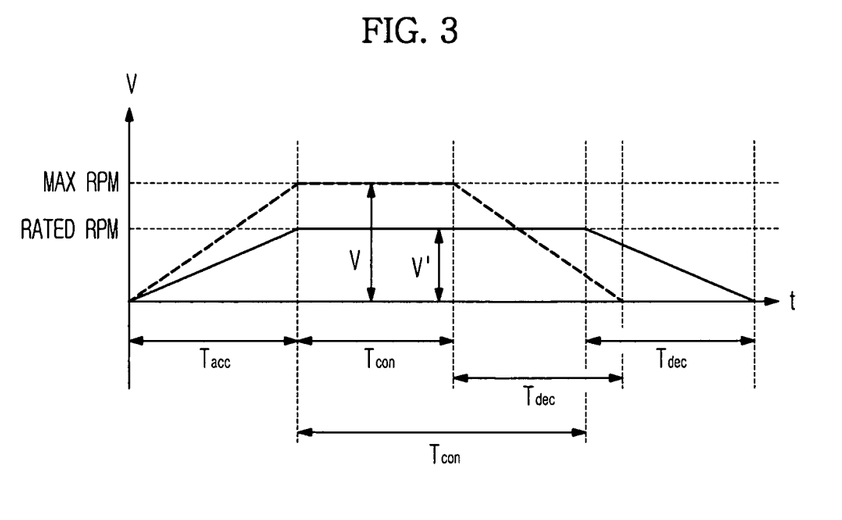
FIG. 3 is a graph illustrating a velocity profile generated based on data received from a user in the motor velocity control apparatus in accordance with the embodiment of the present disclosure.

FIG. 3 is a graph illustrating a velocity profile generated based on data received from a user in the motor velocity control apparatus in accordance with the embodiment of the present disclosure.

In FIG. 3, the trapezoidal velocity profile generated based on the velocity profile generation data received from the user, such as the movement amount, the velocity, the acceleration time, and the deceleration time of the motor 20, requires regular current during acceleration or deceleration, and has a short time to reach a target position, thereby being mainly used.

The trapezoidal velocity profile of the motor 20 is divided into an acceleration section Tacc, a constant velocity section Tcon, and a deceleration section Tdec according to the movement amount, the velocity, the acceleration time, and the deceleration time of the motor 20.

The acceleration section Tacc and the deceleration Tdec are set to prevent step out of the motor 20 at the highest velocity value, and set values thereof are important. If the acceleration time is excessively long, a constant operating time is shortened, and in case of such an operation, the velocity of the motor 20 is low. The position of the motor 20 is represented by an area, and the acceleration time and the deceleration time are generally set to be equal.

The most important factor in the operation of the motor 20 is prevention of step out of the motor 20 during operation of the motor 20. Therefore, the highest RPM of the motor 20 is generally set not to exceed the rated RPM.

A solid line represents a conventional velocity profile in which the highest RPM V' is set to the rated RPM.

On the other hand, a dotted line represents a velocity profile in which the highest RPM V is set to the maximum RPM. That is, the velocity profile represented by the dotted line is obtained by increasing only the velocity to be higher than the velocity in the velocity profile represented by the solid line. In this embodiment, since the velocity profile generated based on the data received from the user is compensated for using accelerations in the respective velocity sections, step out of the motor 20 even when the motor 20 is driven using the velocity profile represented by the dotted line is prevented.

In FIG. 3, the movement amount of the motor 20 in the velocity profile represented by the dotted line and the movement amount of the motor 20 in the velocity profile represented by the solid line, i.e., the trapezoidal areas of the respective velocity profiles are equal.

In this embodiment, the motor 20 is first driven using the velocity profile represented by the solid line, and is then driven using the compensated velocity profile, obtained by compensating for the former velocity profile in each velocity section using acceleration in real time, so that performance of the motor 20 is stable while driving the motor to the maximum RPM.

Figure 4:
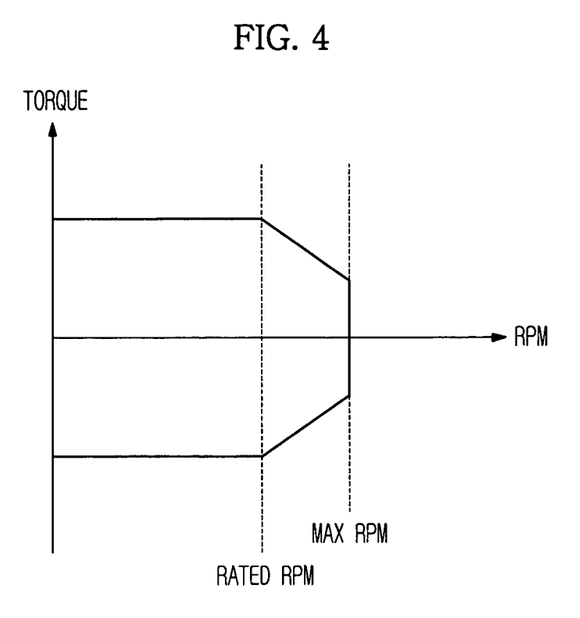
FIG. 4 is a graph illustrating an NT-curve in the motor velocity control apparatus in accordance with the embodiment of the present disclosure.
Figure 5:
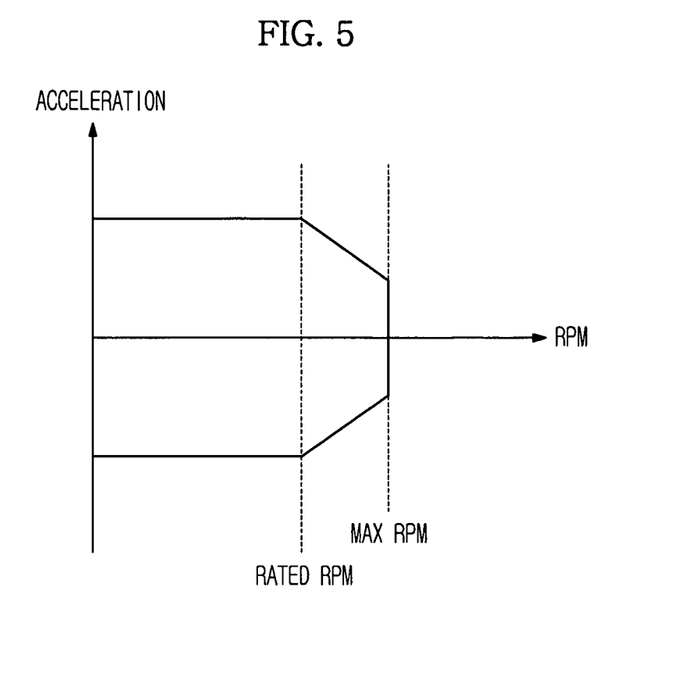
FIG. 5 is an acceleration-velocity graph in the motor velocity control apparatus in accordance with the embodiment of the present disclosure.

FIG. 4 is a graph illustrating the NT-curve in the motor velocity control apparatus in accordance with the embodiment of the present disclosure, and FIG. 5 is the acceleration-velocity graph in the motor velocity control apparatus in accordance with the embodiment of the present disclosure.

As shown in FIGS. 4 and 5, as RPM increases, a torque generated by the motor 20 decreases. Further, in the same manner, as the motor approaches a high velocity region, the acceleration of the motor 20 decreases.

That is, the torque of the motor 20 is direct proportional to acceleration or the two values have a relation similar to the direct proportion.

In view of the above, a method of compensating for the velocity profile using acceleration in accordance with the embodiment of the present disclosure will be described with reference to FIG. 6.

Figure 6:
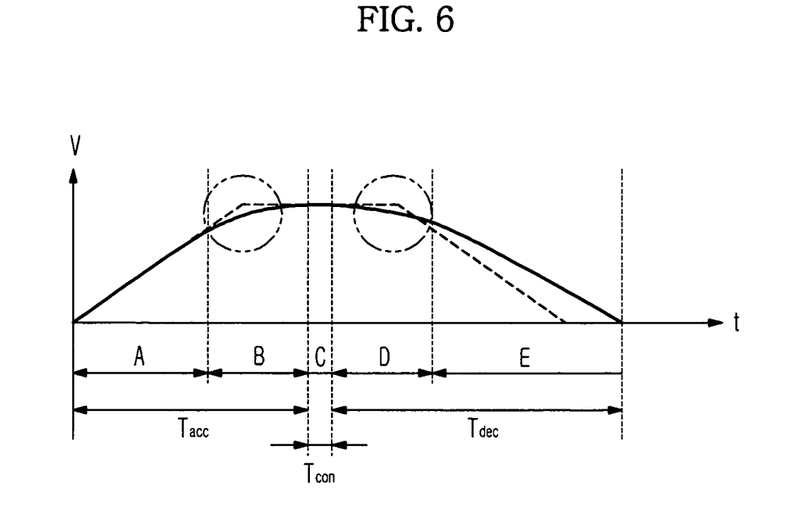
FIG. 6 is a graph illustrating a velocity profile compensated by the motor velocity control apparatus in accordance with the embodiment of the present disclosure.

FIG. 6 is a graph illustrating a velocity profile compensated by the motor velocity control apparatus in accordance with the embodiment of the present disclosure.

In FIG. 6, velocity sections of the velocity profile to drive the motor 20 are divided into an acceleration section A, an acceleration compensation section B, a constant velocity section C, a deceleration compensation section D, and a deceleration section E.

Further, the velocity profile in each velocity section is generated using Equation 1 to Equation 5 below.

In case of the acceleration section A, the velocity profile is generated by Equation 1 below.

$$(V_g - V_0) \times \frac{T'_{acc}}{T_{acc}} \quad \text{[Equation 1]}$$

In case of the acceleration compensation section B, the velocity profile is generated by Equation 2 below.

$$(a+1)^{n-1}\left(V_r + \frac{b}{a}\right) - \frac{b}{a} \quad \text{[Equation 2]}$$

In case of the constant velocity section C, the velocity profile is generated by Equation 3 below.

$$V_g \quad \text{[Equation 3]}$$

In case of the deceleration compensation section D, the velocity profile is generated by Equation 4 below.

$$(1-a)^n\left(V_g + \frac{b}{a}\right) - \frac{b}{a} \quad \text{[Equation 4]}$$

In case of the deceleration section E, the velocity profile is generated by Equation 5 below.

$$\frac{(V_r - V_0)}{(V_g - V_0)} \times T_{dec} \quad \text{[Equation 5]}$$

In Equation 1 to Equation 5, $V_g$ represents a final velocity, $V_o$ represents an initial velocity, $V_r$ represents an acceleration compensation start/escape velocity, $T_{acc}$ represents an initial acceleration time, $T'_{acc}$ represents a deceleration time after compensation, $T_{dec}$ represents an initial deceleration time, a represents a first acceleration compensation graph constant, b represents a second acceleration compensation graph constant, and n represents a sampling time.

In FIG. 6, a dotted line represents a velocity profile prior to compensation, and a solid line represents a velocity profile after compensation, i.e., a compensated velocity profile.

As shown in circles, it is confirmed that in the compensated velocity profile represented by the solid line, velocity profile compensation is carried out mainly around high velocity regions, compared with the velocity profile prior to compensation represented by the dotted line. This occurs because the acceleration of the motor decreases as the motor approaches the high velocity region, as shown in FIG. 5.

That is, as shown in the circles of FIG. 6, when the acceleration section transitions to the constant velocity section and when the constant velocity section transitions to the deceleration section, velocity profile compensation is mainly carried out. Here, it is confirmed that the velocity of the compensated velocity profile is lowered than the velocity of the velocity profile prior to compensation for limited periods corresponding to the circles.

In more detail, before the motor 20 reaches the region of the circle in which the acceleration section transitions to the constant velocity section, i.e., when the motor 20 is located in the acceleration section A, the motor 20 is driven based on the velocity profile prior to compensation.

This means that in the acceleration section A, the acceleration corresponding to the current velocity does not exceed a torque value on the NT-curve of FIG. 4 having the corresponding velocity.

Thereafter, when the motor 20 reaches the region of the first circle in which the acceleration section transitions to the constant velocity section, i.e., the acceleration compensation section B, the motor 20 is driven based on the compensated velocity profile.

This means that in the region of the first circle, the acceleration corresponding to the current velocity exceeds a torque value on the NT-curve of FIG. 4 having the corresponding velocity.

Thereafter, when the motor 20 reaches the region of the second circle in which the constant velocity section transitions to the deceleration section, i.e., the deceleration compensation section D, the motor 20 is driven based on the compensated velocity profile.

This means that in the region of the second circle, the acceleration corresponding to the current velocity exceeds a torque value on the NT-curve of FIG. 4 having the corresponding velocity.

Thereafter, when the motor 20 reaches the deceleration section E, the motor 20 is driven based on the velocity profile prior to compensation.

This means that in the deceleration section E, the acceleration corresponding to the current velocity does not exceed a torque value on the NT-curve of FIG. 4 having the corresponding velocity.

As described above, it is understood that the result of the velocity profile compensation method using the acceleration reduced at high velocity regions is similar to the result of the velocity profile compensation method using the dynamic equation.

Further, the compensated velocity profile is generated by reflecting velocity values in the respective velocity sections calculated using acceleration on the velocity profile represented by the dotted line. Here, the compensated velocity profile may be obtained by compensating for the velocity profile represented by the dotted line in all velocity sections, or by compensating for the velocity profile represented by the dotted line only in velocity sections which will proceed in the future, except for velocity sections that have already been completed.

Figure 7:
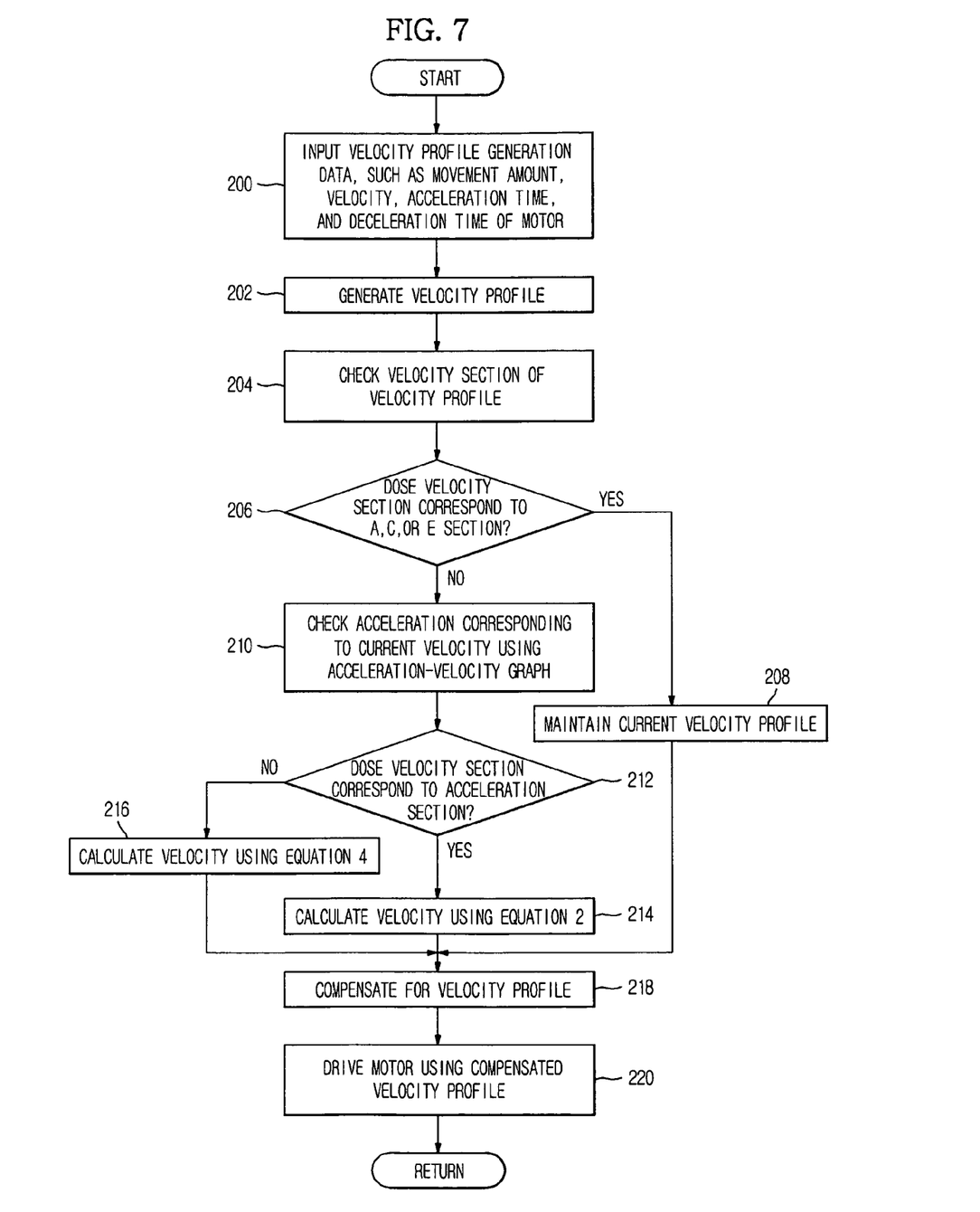
FIG. 7 is a flow chart illustrating a motor velocity control method in accordance with the embodiment of the present disclosure.

FIG. 7 is a flow chart illustrating a motor velocity control method in accordance with the embodiment of the present disclosure.

As shown in FIG. 7, the motor control unit 120 first receives velocity profile generation data, such as a movement amount, a velocity, an acceleration time, and a deceleration time of the motor 20, from a user through the input unit 110 (operation 200).

When the velocity profile generation data, such as the movement amount, the velocity, the acceleration time, and the deceleration time of the motor 20, from the user are received by the motor control unit 120, the motor control unit 120 controls the velocity profile generation unit 130 so as to generate a velocity profile based on the movement amount, the velocity, the acceleration time, and the deceleration time of the motor 20 (operation 202).

When the velocity profile is generated based on the velocity profile generation data received from the user, the control unit 120 checks a velocity section of the generated velocity profile (operation 204).

This occurs because compensated velocities in respective velocity sections of the velocity profile are different.

Therefore, the motor control unit 120 judges whether or not the velocity section of the generated velocity profile corresponds to the acceleration section A, the constant velocity section C, or the deceleration section E (operation 206), and, upon judging that the velocity section of the generated velocity profile corresponds to the acceleration section A, the constant velocity section C, or the deceleration section E, maintains the generated current velocity profile (operation 208).

On the other hand, as a result of the judgment of operation 206, upon judging that the velocity section of the generated velocity profile does not correspond to the acceleration section A, the constant velocity section C, or the deceleration section E, the motor control unit 120 checks an acceleration value corresponding to the current velocity using the acceleration-velocity graph of FIG. 5 (operation 210).

Therefore, the motor control unit 120 judges whether or not the current velocity section corresponds to the acceleration section using the acceleration value corresponding to the current velocity (operation 212), and, upon judging that the current velocity section corresponds to the acceleration section, calculates a velocity of the motor 20 using Equation 2 below to compensate for the velocity profile in the acceleration section (operation 214).

$$(a+1)^{n-1}\left(V_r + \frac{b}{a}\right) - \frac{b}{a} \quad \text{[Equation 2]}$$

This occurs because the acceleration decreases as the motor approaches the high velocity region, as shown in FIG. 5, and thus the velocity profile in the high velocity region (the acceleration compensation section B of FIG. 6) in which the acceleration section transitions to the constant velocity section needs to be compensated for.

On the other hand, as a result of operation 212, upon judging that the current velocity section does not correspond to the acceleration section, the motor control unit 120 calculates a velocity of the motor 20 using Equation 4 below to compensate for the velocity profile in the deceleration section (operation 216).

$$(1-a)^n\left(V_g + \frac{b}{a}\right) - \frac{b}{a} \quad \text{[Equation 4]}$$

This occurs because the acceleration decreases as the motor approaches the high velocity region, as shown in FIG. 5, and thus the velocity profile in the high velocity region (the deceleration compensation section D of FIG. 6) in which the constant velocity transitions to the deceleration section needs to be compensated for.

Thereafter, the motor control unit 120 controls the velocity profile compensation unit 150 so as to compensate for the current velocity profile in the acceleration compensation section B or the deceleration compensation section D using the calculated velocity (operation 218).

Therefore, the compensated velocity profile, as shown in FIG. 6, is generated by maintaining the current velocity profile in the acceleration section A, the constant velocity section C, and the deceleration section E and compensating for the current velocity profile in the acceleration compensation section B and the deceleration compensation section D.

Thereafter, the motor control unit 120 controls the motor drive unit 160 so as to drive the motor 20 using the compensated velocity profile (operation 220).

As is apparent from the above description, a motor velocity control apparatus and method in accordance with one embodiment of the present disclosure compensates for a velocity profile used to drive a motor in real time using acceleration, thus increasing a driving velocity of the motor to the maximum velocity while stably maintaining performance of the motor. Thereby, efficiency of the motor is increased, the velocity of the motor is based on the acceleration made by data obtained through experimentation and is thus more precisely and simply calculated than the conventional compensation algorithm using dynamics, and reliability in driving of the motor is assured.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method of controlling a velocity of a motor to drive a joint of a robot comprising:

generating a velocity profile of the motor based on velocity profile generation data received from a user;

judging whether or not one velocity section selected from velocity sections divided from the generated velocity profile corresponds to a high velocity region, the velocity sections including an acceleration section, an acceleration compensation section, a constant velocity section, a deceleration compensation section, and a deceleration section, where the high velocity region corresponds to the acceleration compensation section in which the acceleration section transitions to the constant velocity section;

estimating an acceleration corresponding to the current velocity of the motor, upon judging that the velocity section corresponds to the high velocity region, the acceleration corresponding to the current velocity is estimated using an acceleration-velocity graph in the acceleration compensation section or the deceleration compensation section;

compensating for the velocity profile using the estimated acceleration; and driving the motor using the compensated velocity profile, wherein the acceleration-velocity graph is a pattern table in which the acceleration corresponding to the current velocity is stored in advance using the fact that the acceleration is directly proportional to a torque of the motor.

2. A method of controlling a velocity of a motor to drive a joint of a robot comprising:

generating a velocity profile of the motor based on velocity profile generation data received from a user;

judging whether or not one velocity section selected from velocity sections divided from the generated velocity profile corresponds to a high velocity region, the velocity sections including an acceleration section, an acceleration compensation section, a constant velocity section, a deceleration compensation section, and a deceleration section, where the high velocity region corresponds to the acceleration compensation section in which the acceleration section transitions to the constant velocity section;

estimating an acceleration corresponding to the current velocity of the motor, upon judging that the velocity section corresponds to the high velocity region, the acceleration corresponding to the current velocity is estimated using an acceleration-velocity graph in the acceleration compensation section or the deceleration compensation section;

compensating for the velocity profile using the estimated acceleration; and driving the motor using the compensated velocity profile, wherein, in the compensation of the velocity profile, the velocity of the motor is calculated using the following equation and the velocity profile is compensated for using the calculated velocity of the motor, if the high velocity region corresponds to the acceleration compensation section:

$$(a+1)^{n-1}\left(V_r + \frac{b}{a}\right) - \frac{b}{a}$$

where $V_r$ represents an acceleration compensation start/escape velocity, a represents a first acceleration compensation graph constant, b represents a second acceleration compensation graph constant, and n represents a sampling time.

3. A method of controlling a velocity of a motor to drive a joint of a robot comprising:

generating a velocity profile of the motor based on velocity profile generation data received from a user;

judging whether or not one velocity section selected from velocity sections divided from the generated velocity profile corresponds to a high velocity region, the velocity sections including an acceleration section, an acceleration compensation section, a constant velocity section, a deceleration compensation section, and a deceleration section;

estimating an acceleration corresponding to the current velocity of the motor, upon judging that the velocity section corresponds to the high velocity region;

compensating for the velocity profile using the estimated acceleration; and driving the motor using the compensated velocity profile, wherein the high velocity region corresponds to the deceleration compensation section in which the constant velocity section transitions to the deceleration section, and wherein, in the compensation of the velocity profile, the velocity of the motor is calculated using the following equation and the velocity profile is compensated for using the calculated velocity of the motor, if the high velocity region corresponds to the deceleration compensation section:

$$(1-a)^n\left(V_g + \frac{b}{a}\right) - \frac{b}{a}$$

here, $V_g$ represents a final velocity, a represents a first acceleration compensation graph constant, b represents a second acceleration compensation graph constant, and n represents a sampling time.

4. A method of controlling a velocity of a motor to drive a joint of a robot comprising:

generating a velocity profile of the motor based on velocity profile generation data received from a user;

judging whether or not one velocity section selected from velocity sections divided from the generated velocity profile corresponds to a high velocity region, the velocity sections including an acceleration section, an acceleration compensation section, a constant velocity section, a deceleration compensation section, and a deceleration section;

estimating an acceleration corresponding to the current velocity of the motor, upon judging that the velocity section corresponds to the high velocity region;

compensating for the velocity profile using the estimated acceleration; and driving the motor using the compensated velocity profile, wherein the high velocity region corresponds to the deceleration compensation section in which the constant velocity section transitions to the deceleration section, wherein, in the estimation of the acceleration corresponding to the current velocity, the acceleration corresponding to the current velocity is estimated using an acceleration-velocity graph in the acceleration compensation section or the deceleration compensation section, and wherein the acceleration-velocity graph is a pattern table in which the acceleration corresponding to the current velocity is stored in advance using the fact that the acceleration is directly proportional to a torque of the motor.

5. A motor velocity control apparatus comprising:

a motor to drive a joint of a robot;

a velocity profile generation unit to generate a velocity profile of the motor based on velocity profile generation data received from a user;

an acceleration estimation unit to estimate an acceleration in a high velocity region of the generated velocity profile;

a velocity profile compensation unit to compensate the velocity profile using the estimated acceleration;

a motor drive unit to drive the motor using the compensated velocity profile; and a motor control unit to judge whether or not one velocity section selected from velocity sections divided from the generated velocity profile corresponds to the high velocity region, to estimate the acceleration corresponding to the current velocity of the motor, upon judging that the velocity section corresponds to the high velocity region, to calculate the velocity of the motor using the estimated acceleration, and to compensate for the velocity profile using the calculated velocity of the motor, the velocity sections divided from the generated velocity profile include an acceleration section, an acceleration compensation section, a constant velocity section, a deceleration compensation section, and a deceleration section, wherein the motor control unit judges the acceleration compensation section in which the acceleration section transitions to the constant velocity section or the deceleration compensation section in which the constant velocity section transitions to the deceleration section to be the high velocity region, and wherein the motor control unit calculates the velocity of the motor using the following equation and compensates for the velocity profile using the calculated velocity of the motor, if the acceleration compensation section is judged to be the high velocity region:

$$(a+1)^{n-1}\left(V_r + \frac{b}{a}\right) - \frac{b}{a}$$

where $V^r$ represents an acceleration compensation start/escape velocity, a represents a first acceleration compensation graph constant, b represents a second acceleration compensation graph constant, and n represents a sampling time.

6. The motor velocity control apparatus according to claim 5, wherein the motor control unit estimates the acceleration corresponding to the current velocity using an acceleration-velocity graph in the acceleration compensation section or the deceleration compensation section.

7. A motor velocity control apparatus comprising:

a motor to drive a joint of a robot;

a velocity profile generation unit to generate a velocity profile of the motor based on velocity profile generation data received from a user;

an acceleration estimation unit to estimate an acceleration in a high velocity region of the generated velocity profile;

a velocity profile compensation unit to compensate the velocity profile using the estimated acceleration;

a motor drive unit to drive the motor using the compensated velocity profile; and a motor control unit to judge whether or not one velocity section selected from velocity sections divided from the generated velocity profile corresponds to the high velocity region, to estimate the acceleration corresponding to the current velocity of the motor, upon judging that the velocity section corresponds to the high velocity region, to calculate the velocity of the motor using the estimated acceleration, and to compensate for the velocity profile using the calculated velocity of the motor, the velocity sections divided from the generated velocity profile include an acceleration section, an acceleration compensation section, a constant velocity section, a deceleration compensation section, and a deceleration section, wherein the motor control unit judges the acceleration compensation section in which the acceleration section transitions to the constant velocity section or the deceleration compensation section in which the constant velocity section transitions to the deceleration section to be the high velocity region, and wherein the motor control unit calculates the velocity of the motor using the following equation and compensates for the velocity profile using the calculated velocity of the motor, if the deceleration compensation section is judged to be the high velocity region:

$$(1-a)^n\left(V_g + \frac{b}{a}\right) - \frac{b}{a}$$

where $V_g$ represents a final velocity, a represents a first acceleration compensation graph constant, b represents a second acceleration compensation graph constant, and n represents a sampling time.

* * * * *

UNITED STATES PATENT AND TRADEMARK OFFICE
CERTIFICATE OF CORRECTION

PATENT NO. : 8,886,360 B2
APPLICATION NO. : 13/200712
DATED : November 11, 2014
INVENTOR(S) : Lee et al.

It is certified that error appears in the above-identified patent and that said Letters Patent is hereby corrected as shown below:

In the claims

Column 13, line 48, claim 5, delete "$V^r$" and insert -- $V_r$ --, therefor.

Signed and Sealed this
Twenty-third Day of June, 2015

Michelle K. Lee
*Director of the United States Patent and Trademark Office*